(12) United States Patent
Erman et al.

(10) Patent No.: US 10,506,440 B2
(45) Date of Patent: *Dec. 10, 2019

(54) METHOD AND APPARATUS FOR DETECTING TETHERING IN A COMMUNICATIONS NETWORK

(71) Applicant: AT&T Intellectual Property I, L.P., Atlanta, GA (US)

(72) Inventors: Jeffrey Erman, Morristown, NJ (US); Alexandre Gerber, Madison, NJ (US); Oliver Spatscheck, Randolph, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 235 days.

This patent is subject to a terminal disclaimer.

(21) Appl. No.: 15/633,063

(22) Filed: Jun. 26, 2017

(65) Prior Publication Data

US 2017/0295496 A1   Oct. 12, 2017

Related U.S. Application Data

(63) Continuation of application No. 14/629,157, filed on Feb. 23, 2015, now Pat. No. 9,693,248, which is a continuation of application No. 14/293,098, filed on Jun. 2, 2014, now Pat. No. 8,966,078, which is a continuation of application No. 13/330,432, filed on Dec. 19, 2011, now Pat. No. 8,745,225.

(51) Int. Cl.
*H04W 12/12* (2009.01)
*H04W 88/04* (2009.01)
*H04W 12/10* (2009.01)
*H04W 24/08* (2009.01)
*G06F 15/163* (2006.01)
*H04W 76/14* (2018.01)

(52) U.S. Cl.
CPC .......... *H04W 12/12* (2013.01); *G06F 15/163* (2013.01); *H04W 12/10* (2013.01); *H04W 24/08* (2013.01); *H04W 76/14* (2018.02); *H04W 88/04* (2013.01)

(58) Field of Classification Search
CPC ........ G06F 21/57; G06F 15/163; A63F 13/12; H04L 63/0892; H04W 12/10; H04W 12/12; H04W 24/08; H04W 76/14; H04W 88/04

See application file for complete search history.

(56) References Cited

U.S. PATENT DOCUMENTS

2005/0177515 A1*  8/2005  Kalavade ............ H04L 63/0892
                                                    705/52
2012/0079080 A1*  3/2012  Pishevar .................. A63F 13/12
                                                    709/220
2012/0167162 A1*  6/2012  Raleigh ................... G06F 21/57
                                                    726/1

* cited by examiner

*Primary Examiner* — Le H Luu

(57) ABSTRACT

A method, non-transitory computer readable medium and apparatus for detecting a tethering function being performed by an endpoint device in a communications network are disclosed. For example, the method analyzes a data packet directed towards the endpoint device, detects a signature based upon analyzing the data packet, and identifies the endpoint device as performing the tethering function based upon detecting the signature.

20 Claims, 3 Drawing Sheets

METHOD AND APPARATUS FOR DETECTING TETHERING IN A COMMUNICATIONS NETWORK

This application is a continuation of U.S. patent application Ser. No. 14/629,157, filed Feb. 23, 2015, now U.S. Pat. No. 9,693,248, which is a continuation of U.S. Ser. No. 14/293,098, filed Jun. 2, 2014, now U.S. Pat. No. 8,966,078, which is a continuation of U.S. patent application Ser. No. 13/330,432, filed Dec. 19, 2011, now U.S. Pat. No. 8,745,225, all of which are herein incorporated by reference in their entirety.

The present disclosure relates generally to detecting tethering and, more particularly, to a method and apparatus for detecting tethering using data signatures.

BACKGROUND

Currently, software patches exist that allow endpoint devices to share their wireless data connection with other devices using a hotspot or a direct cable connection (known as "tethering"). Currently, it is difficult to identify endpoint devices that are tethering.

Tethering is detrimental to a network service provider. For example, tethering creates more network data traffic over the service provider network by end point devices that are not subscribers of the network service provider. Unauthorized tethering effectively "steals" bandwidth from the network service provider without paying for the service.

SUMMARY

In one embodiment, the present disclosure provides a method for detecting a tethering function being performed by an endpoint device in a communications network. For example, the method analyzes a data packet directed towards the endpoint device, detects a signature based upon analyzing the data packet, and identifies the endpoint device as performing the tethering function based upon detecting the signature.

BRIEF DESCRIPTION OF THE DRAWINGS

The present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for detecting tethering in a communications network. Tethering may be defined as when a first endpoint device allows a second endpoint device to connect to it, either via a wired or wireless connection, and serves as a conduit for the second endpoint device to transmit and receive data using a communications network that is subscribed to by the first endpoint device.

Software patches exist that allow endpoint devices to tether to a subscriber endpoint device even if the subscriber endpoint device is not subscribed to a tethering subscription plan with a service provider of the communications network. Unauthorized tethering leads to unrealized capital by the service provider and losses related to additional strain in bandwidth and network resources being consumed by endpoint devices that are not subscribers of the service provider's communications network.

Currently, detecting endpoint devices that are tethering is difficult. However, in order to prevent unauthorized tethering, it is necessary to first detect the unauthorized tethering. In one embodiment, the present disclosure provides tethering detection by using signatures of data packets intended for an endpoint device. As a result, if the service provider can easily detect unauthorized tethering, additional strain on the service provider's communications network resources may be alleviated and/or the service provider may have a greater opportunity to capitalize on tethering users.

Figure 1:
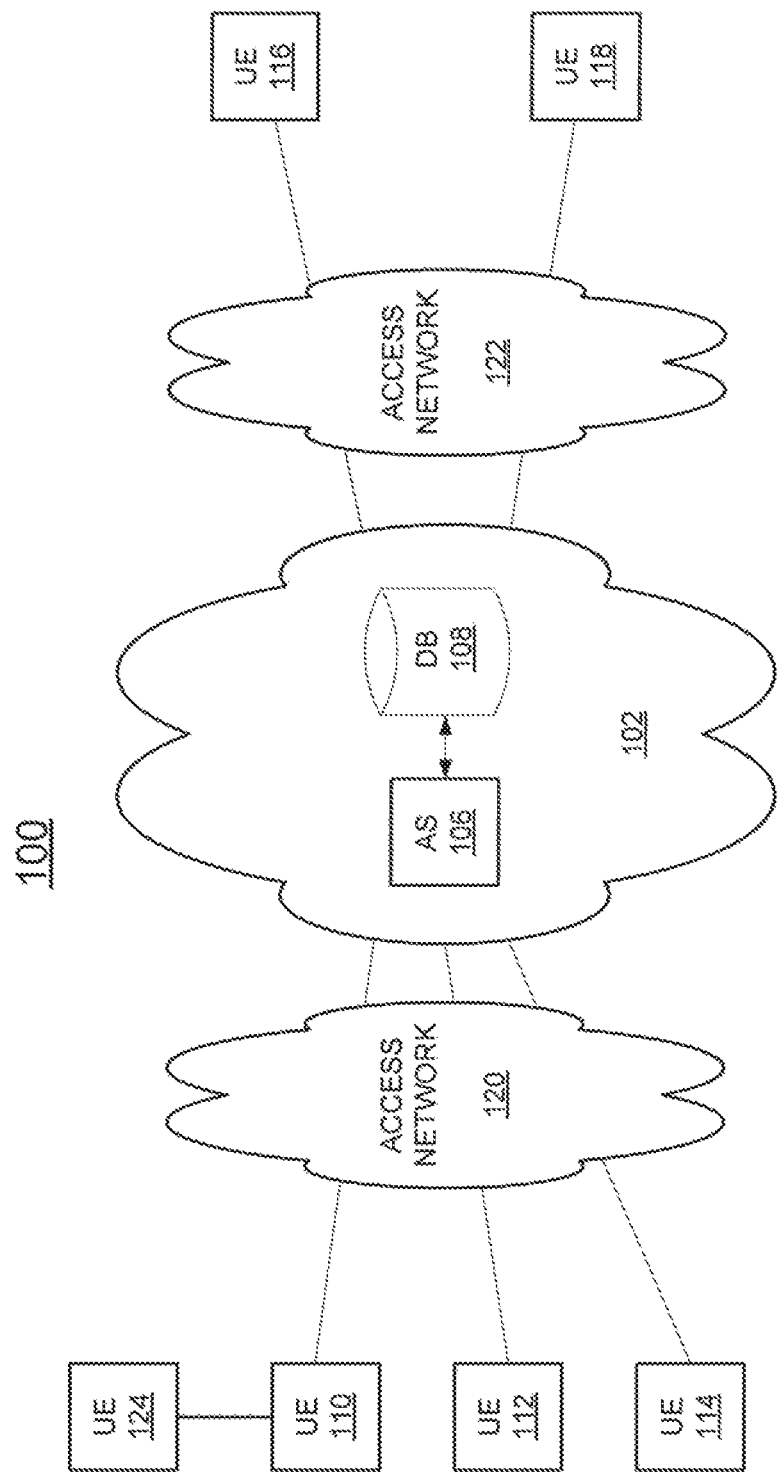
FIG. 1 illustrates one example of a communications network of the present disclosure.

FIG. 1 is a block diagram depicting one example of a communications network 100. The communications network 100 may be any type of communications network, such as for example, a traditional circuit switched network (e.g., a public switched telephone network (PSTN)) or an IP network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. The core network 102 may be in communication with one or more access networks 120 and 122. The access networks 120 and 122 may include a wireless access network (e.g., a WiFi network and the like), a cellular access network, a PSTN access network, a cable access network, a wired access network and the like. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one embodiment, the access network 120 may be in communication with one or more user endpoint devices (also referred to as "endpoint devices") 110, 112 and 114. In one embodiment, the access network 122 may be in communication with one or more endpoint devices 116 and 118. The endpoint devices 110, 112, 114, 116 and 118 may be any type of endpoint devices capable of telephone communications and/or video conferencing including, for example, a PSTN telephone, a smart phone, a cellular telephone, a laptop, a tablet device, a desktop computer, and the like. In one embodiment, the endpoint devices 110, 112, 114, 116 and 118 may employ user agents that use session initiation protocol (SIP).

In one embodiment, the endpoint devices 110, 112, 114, 116 and 118 may be endpoint devices that are subscribers of services, e.g., provided by a service provider of the core network 102. In other words, the endpoint devices 110, 112, 114, 116 and 118 may be authorized to send and receive data over the core network 102. Some of the endpoint devices 110, 112, 114, 116 and 118 may have subscription plans that include tethering services and some may have subscriptions plans that do not include tethering services, where a tethering service allows a subscriber's endpoint device to be used as a conduit by another endpoint device to access services provided by the core network.

In one embodiment, the network 100 may include an application server (AS) 106 and a database (DB) 108. Although only a single AS 106 and a single database 108 are illustrated, it should be noted that any number of application servers 106 or databases 108 may be deployed. Furthermore, it should be noted that the network 100 as shown in FIG. 1 has been simplified. For example, the core network 102 may comprise numerous other network elements that are not shown, e.g., border elements, routers, switches, gateways, firewalls, application servers, databases, call control elements, policy servers, security devices, content distribution servers, and the like. The operations and functions of these network elements are well known.

In one embodiment, the application server 106 may be in communication with the database 108. In one embodiment, FIG. 1 illustrates the AS 106 and the database 108 being within the core network 102. However, it should be noted that the AS 106 and the database 108 may also be located in any one of the access networks 120 and 122. In other words, tethering services may also be provided by the access networks as well that is separate from the tethering services provided by the core network.

The database 108 may store subscription information associated with each one of the endpoint devices 110, 112, 114, 116 and 118. For example, the endpoint device 112 may be associated with a subscription plan that includes tethering services and the endpoint device 110 may be associated with a subscription plan that does not include tethering services. The database 108 may also store other information associated with each user of the endpoint devices 110, 112, 114, 116 and 118, such as for example, name, home address, detailed subscription plan information and the like.

In one embodiment, the database 108 may also store various signatures of data packets. The signatures may be used to help identify what type of data packet is being sent to the endpoint device. The signature of the data packet may then be compared to the type of data packets that the endpoint device should or should not be receiving to help detect and identify whether an endpoint device is tethering. For example, an iPhone® should not be receiving Windows® update data packets or a mobile telephone should not be receiving data packets that are used only for desktop computers.

For example, data packets may have unique signatures that identify the packet as a Windows® only data packet (e.g., NetBios, Windows® Updates, Microsoft® Bits, Microsoft® CryptAPI, Microsoft® NCSI, and the like), a Macintosh® only data packet (e.g., multicast DNS, PubSub, and the like), a software update data packet (Symantec® Live, Adobe® Update Manger, Site Advisor, Java® Updates, and the like) or a cross platform software data packet (e.g., Limewire® Updates, Azureus® announcements, iTunes®, and the like). Although only a few examples are listed above, the examples should not be considered limiting. It should be noted that other types of data packets may be used having a unique signature to detect and identify tethering that are within the scope of the present disclosure.

In one embodiment, the signature of a data packet may be identified by analyzing a source port and a destination port of the data packet and/or a fixed bit pattern within the data packet. The information collected may then be compared to signatures stored in the database 108 to identify if the information collected matches a known signature in the database 108. This type of analysis may be used for data packets that are non-Hypertext Transfer Protocol (HTTP) based data packets. For example, the AS 106 may analyze a data packet as having a source port of 137 and a destination port of 137 and a particular fixed bit pattern. The AS 106 may then access the database 108 to determine if a match is found for the collected information. In one embodiment, the data packet with a source port of 137 and a destination port of 137 and the particular fixed bit pattern may be detected as having a known signature of a NetBIOS data packet for Windows®.

In some instances, the type of data packet may be identified directly from the data packet by the AS 106 without the need for comparison to signatures stored in the database 108. For example, the signature of data packet may be identified by analyzing a header file of the data packet for data packets that are HTTP based data packets. For example, the header file itself, a user-agent field in the header or a host field in the header may be used to detect a signature of the data packet. For example, for a Windows® update the header may be provided as follows:

Example 1

Example Header for a Windows® update data packet:
HEAD
/v9/windowsupdate/a/selfupdate/WSUS3/x86/Vista/ wsus3setup.cab?11052 00000 HTTP/1.1(0xd)(0xa)
USER-AGENT: Windows-Update-Agent(0xd)(0xa)
HOST: download.windowsupdate.com (0xd)(0xa)

In the above example, the header file indicates that the data packet is a windows update for a Vista operating system. In addition the User-Agent field states that it is a Windows-Update-Agent and the Host field shows that the data packet is a Windows® update. Thus, from the header, information may be gathered that detects a signature of the data packet. For example, analyzing the above data packet would detect that the data packet has a signature of a Windows® update data packet.

In one embodiment, the signature of data packet may be identified by analyzing an announcement in the data packet. For example, some software updates or cross platform software may include an announcement in the data packet that states which operating system that the particular data packet is for. For example, Azerureus® may include an announcement that has the operating system in the User Agent field.

Example 2

Example Header for a Azerureus® data packet:
GET
/announce?info_hash=% . . .
USER-AGENT: Azureus 4.6.0.4; Windows 7; Java 1.6.0_17(0xd)(0xa)
USER-AGENT: Azureus 4.4.0.0; Windows XP; Java 1.6.0_24(0xd)(0xa)

In the above example, the announcement in the GET field is followed by operating system information in the USER-AGENT field. For example, based upon analysis of the data packet, the signature of the data packet indicates that it is an Azerureus® data packet intended for a Windows 7® operating system or a Windows XP® operating system.

In one embodiment, the application server 106 may perform the analysis of the data packet to detect signatures and identify whether the endpoint device is tethering (or broadly performing a tethering function). To illustrate, FIG. 1 illustrates an endpoint device 124 that is tethered to the endpoint device 110. The "tethered" endpoint device 124 may be tethered to the endpoint device 110 via either a wired (e.g., a universal serial bus (USB) connection) or a wireless connection (e.g., a WiFi connection, a Bluetooth® connection and the like). In one embodiment, both the endpoint device 124 and the endpoint device 110 may be cellular smart telephones that are capable of voice and data communications over the communications network 100.

As noted above, the endpoint device 110 may be subscribed to services of the service provider of the core network 102. However, the subscription plan of the endpoint device 110 does not include tethering. Thus, tethering another endpoint device to the endpoint device 110 is not authorized under the current subscription plan of the endpoint device 110.

The endpoint device 124 is not a subscriber to services provided by the service provider of the communications network 100. In another embodiment, the endpoint device 124 may only subscribe to voice services, but not data services. In either scenario, the endpoint device 124 attempts to transmit or receive data over from the core network 102 via tethering to the endpoint device 110.

Currently, it is difficult to detect that the endpoint device 110 is tethered to another endpoint device 124. For example, it is difficult for a service provider to know if a data packet is truly intended for the endpoint device 110 or another endpoint device that is tethered to the endpoint device 110, e.g., the endpoint device 124.

However, embodiments of the present disclosure resolve this problem by identifying when an endpoint device is tethering based upon passive analysis of the data packet. In other words, the analysis is passive because the data packet may be analyzed by simply looking at the data packet without modification or manipulating the data packet. For example, assume that the endpoint device 110 is an iPhone® that operates on an iOS operating system native to the iPhone®. In addition, the endpoint device 124 may be a smart telephone operating a Windows® operating system. The endpoint device 124 may attempt to obtain a Windows® update from the communications network 100 by tethering to the endpoint device 110.

In one embodiment, when the data packet for the Windows® update is found and transmitted across the core network 102 towards the endpoint device 110, the AS 106 may analyze each packet that goes across the core network 102 directed towards the endpoint device 110.

Using the signatures of various data packets stored in the database 108, the AS 106 may compare a signature of the data packet with the signatures stored in the database 108. For example, the AS 106 may detect a signature of a Windows® update data packet by comparison of the data packet to the signatures stored in the database 108.

In another embodiment, the AS 106 may detect a signature of the data packet directly from the data packet. For example, the header may include information or the data packet may include an announcement indicating its signature.

The AS 106 may then check the subscription information associated with the endpoint device 110 in the database 108. For example, the AS 106 may quickly determine that the endpoint device 110 is an iPhone®. Thus, the AS 106 may identify the endpoint device 110 as currently tethering because the endpoint device 110 is attempting to obtain a data packet that is not compatible with the endpoint device 110. In other words, an iPhone® operating an iOS operating system would not need to obtain a Windows® update. Moreover, an iPhone® would typically not be compatible with the Windows® update. Therefore, the presumption is that the data packet is for another device that is connected to the endpoint device 110.

As a result, the AS 106 may also determine from the subscription information associated with the endpoint device 110 that the endpoint device 110 is not authorized for tethering. As a result the AS 106 may send a notification to the user of the endpoint device 110. In one embodiment, the notification may be a warning to stop the unauthorized tethering, a suggestion to change their subscription plan to a tethering subscription plan or a bill to charge for tethering an unauthorized endpoint device.

In one embodiment, AS 106 may track a number of positive tethering instances such that the notification is sent after a predetermined number of tethering instances are identified within a predetermined time period to reduce the likelihood of false positives. For example, if the AS 106 detects that the endpoint device 110 was tethering three times within a one week time period, the AS 106 may send a notification. In another embodiment, the AS 106 may wait until the endpoint device 110 tethers 10 times within a one month time period. It should be noted that any predetermined number within any predetermined time period may be used.

In one embodiment, a list of all of the tethering devices within the predetermined time period may be compiled. The list may be ranked by the endpoint devices with the highest number of tethering instances. In one embodiment, to further reduce the chance of false positives, the endpoint devices associated with subscribers that are switching to a tethering subscription plan, the endpoint devices associated with subscribers that are upgrading to a new device, the endpoint devices associated with subscribers that are "SIM swapping" subscribers and the endpoint devices associated with subscribers who moved their SIM card to a device that is not in their service profile may be removed from the list.

Figure 2:
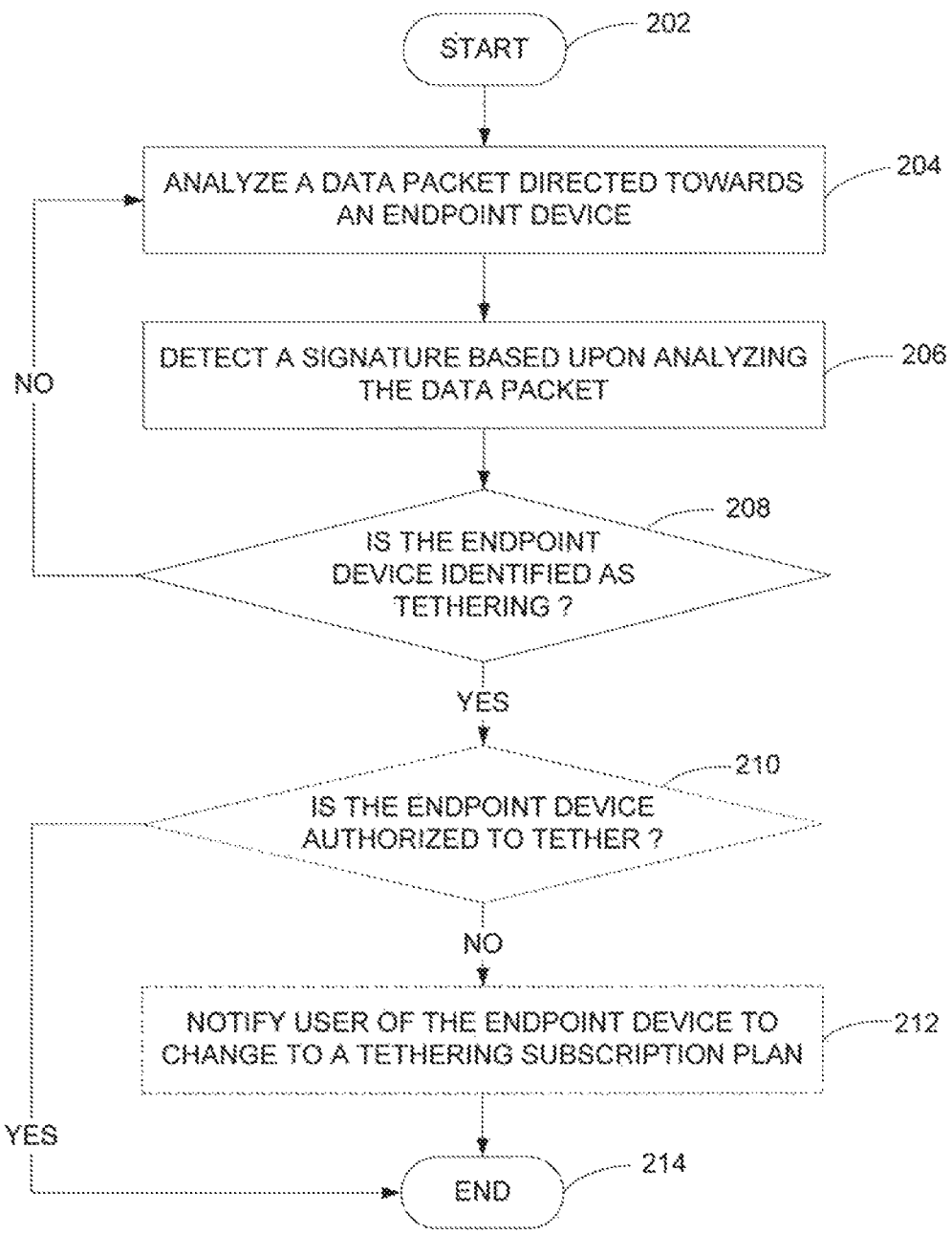
FIG. 2 illustrates an example flowchart of one embodiment of a method for detecting tethering in a communications network.
Figure 3:
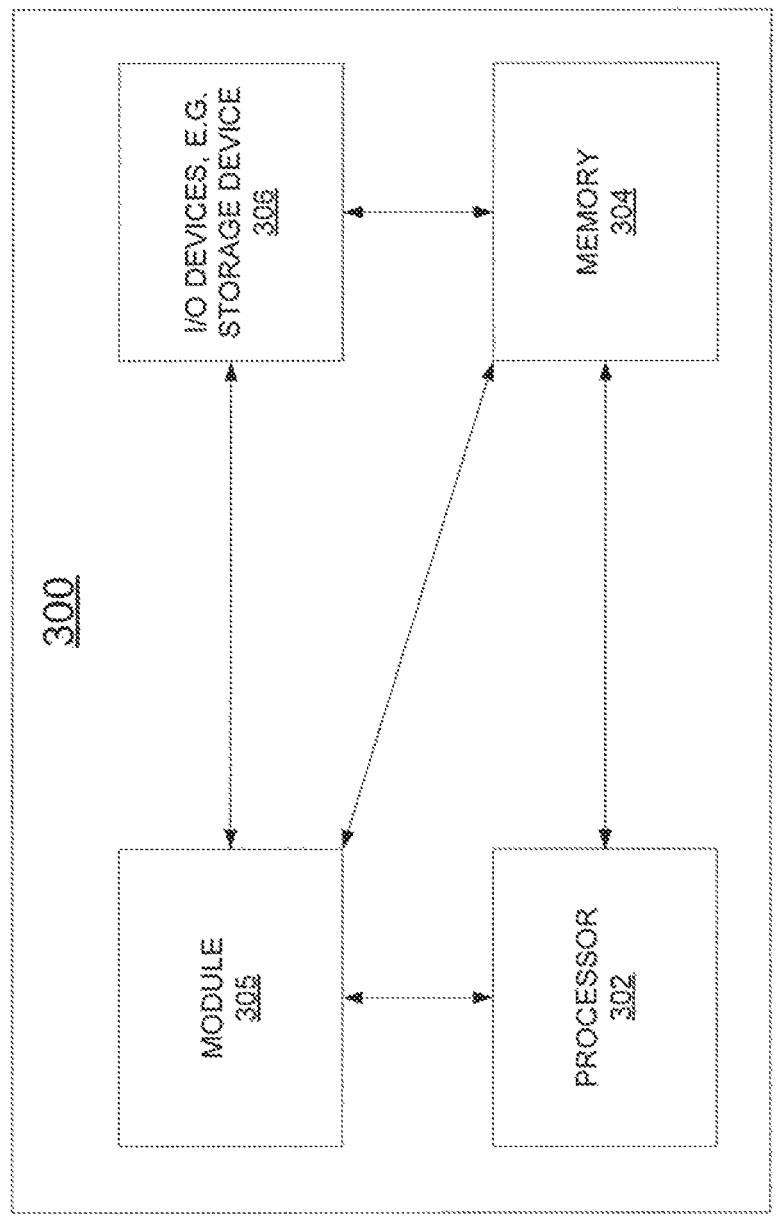
FIG. 3 illustrates a high-level block diagram of a general-purpose computer suitable for use in performing the functions described herein.

FIG. 2 illustrates a flowchart of a method 200 for detecting tethering in a communications network. In one embodiment, the method 200 may be performed by the application server 106 or a general purpose computer as illustrated in FIG. 3 and discussed below.

The method 200 begins at step 202. At step 204, the method 200 analyzes a data packet directed towards an endpoint device. For example, the endpoint device may request a packet that travels through the communications network. An application server in the communications network may intercept the data packet and passively analyze the data packet. Although it is possible to analyze every packet sent to the endpoint device in one embodiment, it should be noted that the method need not analyze every packet sent to the endpoint device. For example, in one embodiment, the analysis can be performed periodically based on time (e.g., every 15 minutes) or periodically based on the number of transmitted data packets (e.g., every one hundred transmitted packets).

In one embodiment, a header of the data packet may be analyzed if the packet is an HTTP-based data packet. In another embodiment, the data packet may be analyzed for announcement messages. In yet another embodiment, if the data packet is a non-HTTP based data packet, information such as a source and a destination port and/or a fixed bit pattern in the data packet may be analyzed.

At step 206, the method 200 detects a signature based upon analyzing the data packet. In one embodiment, once the data packet is analyzed, information gathered from the analysis may be compared to known signatures stored in a database. For example, a source port, a destination port and a fixed bit pattern of the data packet may be compared to signatures stored in the database to determine if a match is found for a known signature.

In another embodiment, the data packet may provide enough information to detect the signature directly from the data packet. For example, the header may indicate the type of file and what operating system the data packet is intended for. In another example, the data packet may include an announcement that indicates the operating system that the data packet is intended for.

At step 208, the method 200 determines if the endpoint device is identified as tethering. If a signature is detected, the signature of the data packet may be analyzed to determine if the endpoint device should or should not be receiving data packets with that type of signature. If the endpoint device should not be receiving data packets with a particular signature, the method 200 may identify the endpoint device as tethering.

For example, the endpoint device may be an iPhone® that operates on an iOS® platform. The data packet in step 206 may be detected as having a signature for a Windows® update data packet. Notably, an iPhone® should not be requesting data packets for a Windows® update. Thus, it may be assumed that the endpoint device is tethered to another endpoint device that is requesting the Windows® update. In other words, if the endpoint device is receiving data packets that are not compatible with the endpoint device, it may be presumed that the endpoint device is tethering.

In one embodiment, to prevent false positives, the endpoint device may be identified as tethering if an endpoint device is identified as tethering a predetermined number of times within a predetermined time period. For example, the endpoint device may only be identified as tethering if the endpoint device was identified as tethering three times within a one week time frame. It should be noted that any predetermined number within any predetermined time period may be used and the above example should not be considered as limiting.

If the endpoint device is not tethering, then the method 200 may loop back to step 204 to continue the analysis of data packets. If the endpoint device is identified as tethering, then the method 200 may proceed to optional step 210.

At optional step 210, the method 200 may determine if the endpoint device is authorized to tether. For example, a subscription plan associated with the endpoint device may be referenced from the database. The subscription plan may include information as to whether or not the endpoint device is authorized to tether. Thus, the endpoint device may be tethering because the subscriber of the endpoint device has paid for a subscription plan that includes a tethering service. If the endpoint device is authorized to tether, then no additional action need be taken and the method 200 proceeds to step 214 where the method 200 ends.

However, if the endpoint device is not authorized to tether, the method 200 may proceed to step 212. At step 212, the method 200 notifies the user of the endpoint device to change to a tethering subscription plan. In one embodiment, the notification may be a text message, an email, an interactive voice call, and the like.

In one embodiment, the notification may include a warning and a suggestion that the user of the endpoint device should change to a tethering subscription plan. In another embodiment, the notification may indicate that any subsequent detections of tethering will automatically effect a change of the subscription plan to a tethering subscription plan. In yet another embodiment, the notification may simply include a charge or a billing notification for a la carte use of the tethering service. The method 200 ends at step 214 or optionally returns to step 204.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a hardware processor element 302 (e.g., a CPU), a memory 304, e.g., random access memory (RAM) and/or read only memory (ROM), a module 305 for detecting tethering in a communication network, and various input/output devices 306, e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed method. In one embodiment, the present module or process 305 for detecting tethering in a communication network can be loaded into memory 304 and executed by hardware processor 302 to implement the functions as discussed above. As such, the present method 305 for detecting tethering in a communications network as discussed above in method 200 (including associated data structures) of the present disclosure can be stored on a non-transitory (e.g., tangible or physical) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for detecting a tethering function being performed by an endpoint device in a communications network, the method comprising:

analyzing, by a processor, a data packet directed towards the endpoint device;

detecting, by the processor, a signature based upon the analyzing the data packet, wherein the signature indicates the data packet is associated with a source port or a destination port, and wherein the detecting the signature comprises identifying the data packet as not being compatible with the endpoint device that is associated with a subscription; and identifying, by the processor, the endpoint device as performing the tethering function based upon the detecting of the signature.

2. The method of claim 1, wherein the analyzing comprises examining a header of the data packet.

3. The method of claim 1, wherein the analyzing comprises examining the source port of the data packet.

4. The method of claim 1, wherein the analyzing comprises examining the destination port of the data packet.

5. The method of claim 1, wherein the endpoint device is identified as performing the tethering function when a predetermined number of tethering instances is detected within a predetermined period of time.

6. The method of claim 1, wherein the endpoint device is a wireless endpoint device associated with the subscription to a service provided by a network service provider of the communications network.

7. The method of claim 1, further comprising:

when the endpoint device is identified as performing the tethering function, then determining whether the endpoint device is an authorized tethering endpoint device; and when the endpoint device is not the authorized tethering endpoint device, then notifying a user of the endpoint device to change to a tethering subscription plan for the endpoint device.

8. A non-transitory computer-readable medium storing a plurality of instructions which, when executed by a processor, cause the processor to perform operations for detecting a tethering function being performed by an endpoint device in a communications network, the operations comprising:

analyzing a data packet directed towards the endpoint device;

detecting a signature based upon the analyzing the data packet, wherein the signature indicates the data packet is associated with a source port or a destination port, and wherein the detecting the signature comprises identifying the data packet as not being compatible with the endpoint device that is associated with a subscription; and identifying the endpoint device as performing the tethering function based upon the detecting of the signature.

9. The non-transitory computer-readable medium of claim 8, wherein the analyzing comprises examining a header of the data packet.

10. The non-transitory computer-readable medium of claim 8, wherein the analyzing comprises examining the source port of the data packet.

11. The non-transitory computer-readable medium of claim 8, wherein the analyzing comprises examining the destination port of the data packet.

12. The non-transitory computer-readable medium of claim 8, wherein the endpoint device is identified as performing the tethering function when a predetermined number of tethering instances is detected within a predetermined period of time.

13. The non-transitory computer-readable medium of claim 8, wherein the endpoint device is a wireless endpoint device associated with the subscription to a service provided by a network service provider of the communications network.

14. The non-transitory computer-readable medium of claim 8, the operations further comprising:

when the endpoint device is identified as performing the tethering function, then determining whether the endpoint device is an authorized tethering endpoint device; and when the endpoint device is not the authorized tethering endpoint device, then notifying a user of the endpoint device to change to a tethering subscription plan for the endpoint device.

15. An apparatus for detecting a tethering function being performed by an endpoint device in a communications network, the apparatus comprising:

a processor; and a computer-readable medium storing a plurality of instructions which, when executed by the processor, cause the processor to perform operations, the operations comprising:

analyzing a data packet directed towards the endpoint device;

detecting a signature based upon the analyzing the data packet, wherein the signature indicates the data packet is associated with a source port or a destination port, and wherein the detecting the signature comprises identifying the data packet as not being compatible with the endpoint device that is associated with a subscription; and identifying the endpoint device as performing the tethering function based upon the detecting of the signature.

16. The apparatus of claim 15, wherein the analyzing comprises examining a header of the data packet.

17. The apparatus of claim 15, wherein the analyzing comprises examining the source port of the data packet, the destination port of the data packet, or both the source port and the destination port of the data packet.

18. The apparatus of claim 15, wherein the endpoint device is identified as performing the tethering function when a predetermined number of tethering instances is detected within a predetermined period of time.

19. The apparatus of claim 15, wherein the endpoint device is a wireless endpoint device associated with the subscription to a service provided by a network service provider of the communications network.

20. The apparatus of claim 15, the operations further comprising:

when the endpoint device is identified as performing the tethering function, then determining whether the endpoint device is an authorized tethering endpoint device; and when the endpoint device is not the authorized tethering endpoint device, then notifying a user of the endpoint device to change to a tethering subscription plan for the endpoint device.

* * * * *